(12) United States Patent
Noggle

(10) Patent No.: US 6,802,676 B2
(45) Date of Patent: Oct. 12, 2004

(54) MILLING INSERT

(75) Inventor: Kenneth G. Noggle, West Bloomfield, MI (US)

(73) Assignee: Valenite LLC, Madison Heights, MI (US)

( * ) Notice: Subject to any disclaimer, the term of this patent is extended or adjusted under 35 U.S.C. 154(b) by 0 days.

(21) Appl. No.: 09/798,836

(22) Filed: Mar. 2, 2001

(65) Prior Publication Data
US 2002/0122699 A1 Sep. 5, 2002

(51) Int. Cl.[7] .......................... B23B 27/22; B23B 29/00
(52) U.S. Cl. ...................................... 407/113; 407/114
(58) Field of Search .................. 407/113, 114, 407/115, 116, 34, 53, 61

(56) References Cited

U.S. PATENT DOCUMENTS

| | | | | |
|---|---|---|---|---|
| 3,762,005 A | * | 10/1973 | Erkfritz | 407/113 |
| 4,294,565 A | * | 10/1981 | Erkfritz | 407/113 |
| 4,297,058 A | * | 10/1981 | Armbrust et al. | 407/113 |
| 4,411,565 A | * | 10/1983 | Hazra et al. | 407/114 |
| 4,556,345 A | * | 12/1985 | Philippi | 407/114 |
| 4,681,488 A | * | 7/1987 | Markusson | 407/114 |
| 4,705,434 A | * | 11/1987 | Patterson et al. | 407/114 |
| 4,840,518 A | * | 6/1989 | Plutschuck et al. | 407/113 |
| 4,954,021 A | * | 9/1990 | Tsujimura et al. | 407/34 |
| 5,035,546 A | * | 7/1991 | Pawlik | 407/116 |
| 5,190,419 A | | 3/1993 | Lindberg et al. | |
| 5,443,335 A | * | 8/1995 | Shimano et al. | 407/113 |
| 5,454,670 A | * | 10/1995 | Noda et al. | 407/114 |
| 5,720,583 A | * | 2/1998 | Bohnet et al. | 407/113 |
| 5,803,674 A | * | 9/1998 | Satran et al. | 407/42 |
| 5,820,308 A | * | 10/1998 | Hoefler | 407/113 |
| 5,853,267 A | * | 12/1998 | Satran et al. | 407/113 |
| 6,050,752 A | * | 4/2000 | DeRoche | 407/114 |
| 6,065,907 A | * | 5/2000 | Ghosh et al. | 407/114 |
| 6,196,771 B1 | * | 3/2001 | Andersson | 407/113 |
| 6,254,316 B1 | * | 7/2001 | Strand | 407/113 |
| 6,336,776 B1 | * | 1/2002 | Noggle | 407/34 |

OTHER PUBLICATIONS

SpectraMill QC System, Flyer Part No. 27–01–205, Feb. 2000, 4 pages.
2 Receiving Slips from Oakland Printing Services, Inc. dated Mar. 3, 2000.

* cited by examiner

Primary Examiner—A. L. Wellington
Assistant Examiner—Brian D. Walsh
(74) Attorney, Agent, or Firm—Burns, Doane, Swecker & Mathis, LLP

(57) ABSTRACT

An insert providing an improved wiper on cutting edges that form the surface finish of a workpiece, wherein the cutting edge is a curve in a plane of the flank that forms the finish cutting edge, the curve having an apex proximate the common corner, the curve forming a wiper on the finish cutting edge at or closely proximate to the apex.

15 Claims, 3 Drawing Sheets

MILLING INSERT

FIELD OF THE INVENTION

The present invention relates generally to indexable cutting inserts and associated cutting tools. More specifically, the invention is directed to indexable polygonal cutting inserts, for milling, reaming, boring and the like having a wiper geometry which improves surface finish generated during machining.

BACKGROUND OF THE INVENTION

It is known in the industry, that each pass of a cutting insert over a workpiece creates a new surface that, under conventional cutting conditions, has a curved geometry substantially corresponding to the curve of the cutting edge around the active cutting corner of the insert. As has been discussed in the literature, the curved surfaces generated result in a part finish, with high and low points that appears "scalloped" in cross-section. Surface finish irregularities are recognized in the industry to result from ordinary machining variables such as workpiece deflection, the feed rate, the size of the nose radius of the cutting insert used and the stability of the machining environment. Multiple insert tools create further surface finish irregularities due to manufacturing tolerances that result in variables in insert position.

Wiper inserts have been developed in an attempt to reduce surface finish irregularities and produce a smoother part finish. Wiper inserts refer to cutting inserts having various geometries at or near the active cutting edge or edges such that as the cutting insert travels over the workpiece and cuts an area therefrom, the new surface that is generated by the cutting edge is "wiped" or "rubbed" by a wiper geometry. The wiper geometry is positioned on the insert finish cutting edge.

In the past, conventional wiper inserts have been manufactured by forming curved peripheral flanks having a large radius or a series of radii on the finish cutting edge to remove surface irregularities, for example the feed line. FIG. 1 shows a top view of an example of a conventional insert 100 having a top surface 110 and curved flanks 120. The flanks 120 of the insert extend outward in the plane of the top surface, which gives this conventional insert the appearance, in top view, of a polygon with sides bulging outward. A drawback of conventional designs and cutting methods based on this concept is that the curved nature of the flanks causes seating problems. When multiple flanks and edges of a conventional insert carry such wiper geometries, expensive tooling of toolholder pockets to match the periphery of the insert is required or the insert does not seat properly in the cutting tool holder. Due to such seating problems, the radiused flank geometry is not put on all sides of the insert, thus retaining flanks with the flat surfaces for seating in the pocket. However, this solution reduces the number of usable wiper cutting edges per insert.

Another design used for wiping is a negative crown applied to top and/or bottom insert surfaces, see FIGS. 2a and 2b. The top surface 210 of the insert 200 has a land 220 that descends from the center 290 of the top surface outward and downward to the flanks 230 of the insert. This land intersecting the flanks creates a cutting edge 240 that is lower, with reference to top surface 210, at the corners 250 of the insert than at mid-flank position 260, thereby forming a resulting radius along the insert cutting edges, in this design, the highest point on the finish cutting edge, with reference to the top surface performs the wiping action. Bottom surface 270 also has a land 280, thereby providing additional cutting edges. The negative crown design results in several drawbacks: This prior art design has the highest point on the finish cutting edge fixed at roughly the mid-flank position between the corners adjacent the cutting edge. Thus, the distance from the active cutting corner to the wiper is dictated by the size of the insert A second drawback is increased horsepower required for cutting due to the obtuse angle between flank 230 and land 220. A third drawback is increased cutting force generated in the workplace and the tool due to the negative crown geometry, which results in workplace deflection, chatter and accelerated tool wear. Furthermore, when the negative crown geometry is used on a positive insert, little, if any, positive cutting angle to the workpiece can be achieved and fewer cutting edges are available, and when used on a negative insert no positive cutting or neutral cutting angle to the workpiece can be obtained and the insert has a limited range of angular presentation of the cutting edge to the workplace.

Hence there is seen to be a need in the cutting tool art for providing an indexable wiper insert for mounting in a cutting tool, such as a rotary milling, reaming, boring tool or the like, having positive cutting action that uses all available cutting edges and seats properly in the tool body. There is a further need for an indexable insert wherein the position of the wiping portion of the cutting edge can be varied for machining around fixtures and the like.

SUMMARY OF THE INVENTION

An object of the invention is to provide a cutting insert, cutting tool and method of machining that overcomes the limitations of the prior art. It is a further object of the invention to provide an indexable wiper insert having positive cutting action that uses all available cutting edges and seats properly in the tool body. It is a yet further object of the invention to provide a positive geometry wiper wherein the position of the wiping portion of the cutting edge can be varied for machining around fixtures and the like.

One object of the invention is to provide a cutting insert of hard, wear resistant material including a body having substantially polygonal major surfaces, flanks extending therebetween, respective pairs of the flanks intersecting to form corners, at least one pair of cutting edges including a lead cutting edge and a finish cutting edge sharing a common corner and being formed by intersection of a major surface with one of the respective pairs of flanks, wherein the finish cutting edge is a curve in a plane of the flank that forms the finish cutting edge, the curve having an apex proximate the common corner, the curve forming a wiper on the finish cutting edge at or closely proximate to the apex. In another aspect of the invention, the wiper may be positioned a selected distance "d2" from the common corner, which can range from 0.5% to 45% of the length of the flank that forms the finish cutting edge. Alternatively, the distance "d2" is selected to range from approximately two times the common corner radius to less than half a length of the flank that forms the finish cutting edge In another aspect of the invention each finish cutting edge extends along a wiper form in the major surface adjacent the finish cutting edge, the wiper form has a positive or neutral geometry.

In another aspect of the invention, the curve includes a first portion defined by a first radius and a second portion defined by a second radius. It is an object of the invention to provide the curve with a second radius that decreases along the finish cutting edge from the wiper to the common corner. Alternatively, the curve may include a first portion defined by a first radius and a second portion defined by a plurality of radii.

It is another object of the invention to provide a cutting insert of hard, wear resistant material including a body having substantially polygonal major surfaces, flanks extending therebetween substantially perpendicular to the surfaces, respective pairs of the flanks intersecting to form corners, at least one pair of cutting edges including a lead cutting edge and a finish cutting edge sharing a common corner and being formed by intersection of a major surface with one of the respective pairs of flanks, the finish cutting edge being curved in a plane of the flank forming the finish cutting edge and having a wiper at a selected position on the finish cutting edge, wherein each finish cutting edge extends along a positive or neutral geometry wiper form in the major surface. Optionally, a chipbreaker form extends along at least a portion of the lead cutting edge.

It is another object of the invention to provide a cutting insert of hard, wear resistant material including a body having substantially polygonal major surfaces, flanks extending therebetween, respective pairs of the flanks intersecting to form corners, cutting edges being formed by intersection of a major surface with the flanks, each cutting edge being a curve in the plane of the respective flank and ascending toward the major surface that forms the cutting edge, the curve having an apex forming a wiper on the cutting edge wherein the wiper is proximate a corner.

In another aspect of the invention, the insert flanks are substantially planar. In yet another aspect of the invention the flanks are substantially perpendicular to the major surfaces such that all cutting edges may be provided with the wiper.

In another aspect of the invention a material removal tool is provided having at least one insert mounted thereto including a body having substantially polygonal major surfaces, flanks extending therebetween, respective pairs of the flanks intersecting to form corners, at least one pair of cutting edges sharing a common corner and being formed by intersection of a major surface with one of the respective pairs of flanks, the insert being positioned in the tool with the common corner as the active cutting corner and the pair of cutting edges including a lead cutting edge and a finish cutting edge wherein the finish cutting edge is a curve in a plane of the flank that forms the finish cutting edge, the curve having an apex proximate the common corner, the apex forming a wiper on the finish cutting edge. An object of the invention is to provide a rotary material removal tool.

It is another object of the invention to provide a method for producing an improved finish on a workpiece, including the steps of selecting an insert comprising a body having substantially polygonal major surfaces, flanks extending therebetween, respective pairs of the flanks intersecting to form corners, cutting edges being formed by intersection of at least one of the major surfaces with the flanks, at least one cutting edge being a curve in the plane of the flank that forms the at least one cutting edge, the curve ascending toward the major surface that forms the at least one cutting edge, the curve having an apex forming a wiper on the at least one cutting edge wherein the wiper is proximate a corner; positioning the cutting insert in a tool holder pocket wherein the corner is active in the use environment during cutting and the cutting edge is presented to the workpiece as a finish cutting edge; securing the cutting insert into the pocket; and machining the workpiece.

DESCRIPTION OF THE PREFERRED EMBODIMENTS

Figure 1:
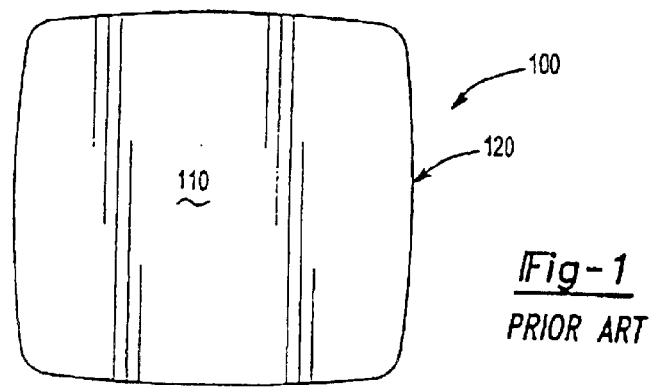
FIG. 1 is a top plan view of a wiper insert according to the prior art.
Figure 2A:
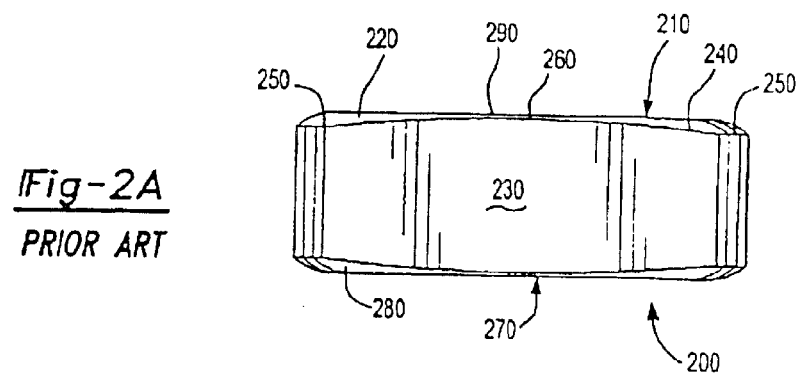
FIG. 2a is a side view of a prior art negative crown wiper insert.
Figure 2B:
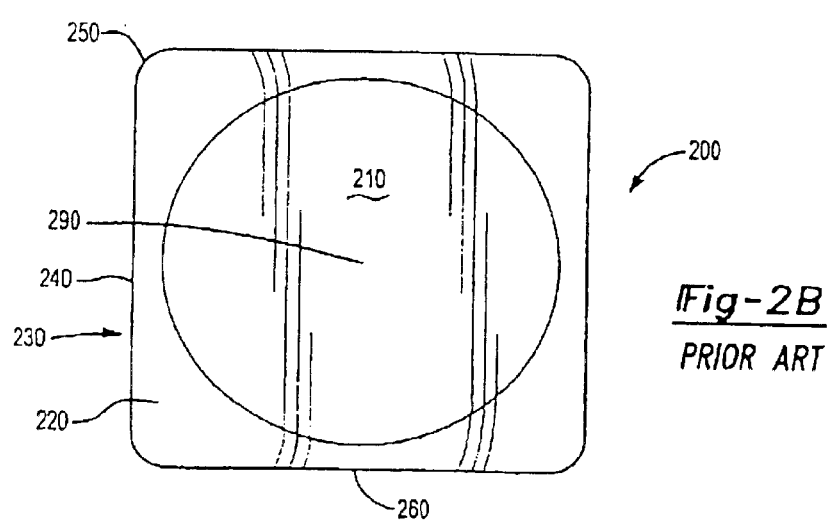
FIG. 2b is a top view of a prior art negative crown wiper insert

The present invention is directed to an insert providing an improved wiper on cutting edges that form the surface finish of a workpiece, a cutting tool utilizing such inserts and a method of machining.

The invention has application to positive and negative indexable cutting inserts of hard, wear resistant material having major surfaces and flanks extending between the major surfaces to form a body. The intersection of at least one of the major surfaces and the flanks forms cutting edges. Respective pairs of the flanks intersect to form corners, also known as "noses", of the insert.

In describing the invention with reference to a particular cutting edge, the flank and the major surface forming that cutting edge are referred to herein as the reference flank and the adjacent major surface. The invention provides a cutting edge that is convexly curved in the plane of the reference flank that forms the cutting edge with the adjacent major surface. That is, the curved cutting edge is not fully encompassed by the plane of the adjacent major surface, but instead lies in a plane of the reference flank, and approaches or intersects the adjacent major surface. The curved cutting edge is closer to the adjacent major surface at the apex of the curve that defines the cutting edge and, optionally, the apex may be substantially in the plane of the major surface. As the cutting edge extends away from the apex in each direction, and toward the insert corners, the cutting edge descends toward the opposite major surface of the insert. In one aspect of the invention, the intersection of the curved cutting edge with the major surface of the insert, preferably at the apex of the curve, forms a wiper on the finish cutting edge.

It is desirable that inserts of the invention be provided with substantially planar flanks, thereby simplifying insert and pocket design and manufacture. The flanks may also be substantially perpendicular to the major surfaces, providing an insert known in the art as a "negative insert" or the flanks may be non-perpendicular thereby providing an insert known in the art as a "positive insert". On a negative insert, all cutting edges may be provided with the curved cutting edge of the invention, whereas positive inserts generally may have all cutting edges adjacent the larger of the major surfaces available for application of the curved cutting edge of the invention.

In another aspect, the invention provides an insert having a curved cutting edge with a wiper form in the adjacent major surface, extending along the cutting edge, preferably the finish cutting edge. The wiper form has a positive or neutral geometry that creates a curved cutting edge that lies in the plane of the reference flank. The curved cutting edge of the invention may provide a positive, neutral or negative cutting angle when presented to the workpiece, depending upon the insert geometry, the wiper geometry, and the angle of the tool body pocket that holds the workpiece. This versatility is an advantage over the negative crown insert.

It is desirable that the curved cutting edge is defined by a curve, or portion thereof, having an apex which may be below, above or in the plane of the adjacent major surface which forms the cutting edge by intersection with the reference flank. The apex of the curve forms a wiper on the cutting edge. For curves having an apex above the adjacent major surface, thereby creating two points of intersection of the curve with this major surface, the line between the two points of intersection of the curve on the major surface forms a wiper on the cutting edge.

Applicant's invention compensates for the maximum variation of position of the insert in the pocket and other manufacturing tolerances, using the curvature of the cutting edge, thereby providing a wiper on the finish cutting edge that continues to perform the wiping function in the event that the insert is located in the cutting tool such that the position of the finish cutting edge is at the high or low end of the tolerance limits of the tool. The curved nature of the cutting edge of Applicant's invention provides a functional wiper regardless of whether the cutting edge is at the high or low end of these tolerances by moving the cutting edge away from the workpiece near the adjacent corners. Thus, where a conventional insert cutting edge would dig into the part surface proximate the active cutting corner or experience trailing edge drag, both due to angulation of the cutting edge to the workpiece that is within tolerances for the tool. Applicant's cutting edge end wiper continue to function properly.

Theoretically, the best wiper is a straight cutting edge, however, due to manufacturing tolerances and other variables it has been found in the industry that straight wipers have performance and repeatability problems. It is thus desirable that the curve or curves which determine the geometry of the curved cutting edge have as large a radius, that is as little curvature, as possible, while providing at least enough curvature to compensate for errors in the position of the finish cutting edge introduced by manufacturing tolerances, such as tool body and insert manufacturing tolerances and other variables.

The upper limit of the radius of the finish cutting edge may be selected empirically with little, if any, experimentation or may be readily calculated by one of ordinary skill in the art by known means. One method of selecting the upper limit of the radius of the finish cutting edge, while still obtaining the benefits of the invention, is to determine the cumulative tolerance applicable to the tool body/insert combination which would affect the position of the finish cutting edge when located in the tool. For instance, by way of non-limiting example, if the manufacturing tolerance of a cutting tool pocket is 0.001 inches of taper per inch and the manufacturing tolerance of an insert is 0.001 inches of taper per inch, then the cumulative tolerance is 0.002 inches of taper per inch. A tolerance recited in inches of taper per inch refers to the amount of allowable error in the angle of the insert flank or pocket. That is, the pocket or insert may be angled somewhat. This results in a variability in the position of the cutting edge in relation to the workpiece due to manufacturing tolerances of 0.002 inches of taper per inch.

The cumulative tolerance is then used to calculate an offset distance "d1", by which the respective ends of the curve generating the curved cutting edge will be offset from the adjacent major surface. This offset is used, in a manner described herein, to generate a curve that compensates for the cumulative tolerance affecting the cutting edge position. The calculation of the offset distance "d1" is based on the geometry of the tool holder and the angular presentation of the cutting edge. Determining such offset distances will be understood to be within the knowledge and ability of one of ordinary skill in the art. With reference to a particular cutting edge, an imaginary plane is generated that is substantially parallel to the adjacent major surface and displaced from the plane of the adjacent major surface, in a direction perpendicular thereto, the offset distance "d1" calculated to provide a curve that compensates for the cumulative tolerance value when the curve is presented to the workpiece in the use environment. Points of intersection between the imaginary plane and flanks of the insert immediately adjacent the reference flank are identified and a curve is generated which includes at least one point of intersection 74, 76 from each adjacent flank and an apex 72. The curve generated determines the finish cutting edge.

The distance of the apex 72 from the active cutting corner and the distance of the apex from the adjacent major surface determines the position and geometry of the wiper. An apex below or in the plans of the major surface results in a curved cutting edge. In comparison, an apex above the plane of the major surface results in a curved cutting edge having a flat wiper portion in the plane of the adjacent major surface. The flat wiper portion extends along the portion of the cutting edge where the curve extends above the cutting edge. The curved cutting edge may be manufactured by any means known in the art including pressing, grinding, printing, extruding and the like.

Another feature of the invention is that the position of the wiper along the finish cutting edge can be conveniently selected during manufacture of the insert. The wiper position is not limited by the size of the insert or limited to the mid-flank position. The insert can be manufactured with the wiper of a cutting edge close to or distant from a selected corner of the insert adjacent the reference flank. In particular, the wiper on an active finish cutting edge may be positioned proximate the respective cutting corner that is active in the use environment. This is an improvement over conventional negative crown inserts which provide a flat flank but have been limited in positioning the wiper to the midpoint of the finish cutting edge. Due to the mid-flank wiper position, the finish cutting edge, extending between the wiper and the active cutting corner of the insert, generates a curved finish surface on the workpiece creating the drawback of non-planar surfaces at part shoulders and near fixtures. Applicant solves this problem by decreasing the distance between the active cutting corner and the wiper. Thus, it is desirable that the wiper is proximate the active cutting corner, proximate meaning closer than mid-flank position from the active cutting corner, preferably 0.5% to 40% of the length of the reference flank. Applicant's invention makes it possible to generate surfaces having improved finish quality closely adjacent protruding features for example, fixture clamps and part bosses, as well as part shoulders.

The wiper may be generated at any selected distance along the length of the insert flank from the active cutting corner by creating a curved finish cutting edge having its apex at approximately the same selected distance from the corner. In one embodiment of the invention, the wiper position on the finish cutting edge is selected to be a distance "d2" from the nose bisector 90 of the active cutting corner. The selected distance can range from approximately two times the value of the nose radius R of the insert to less than half the length of the flank adjacent the finish cutting edge.

The term "nose radius" is understood in the industry to mean the radius of a circle whose arc portion defines the curved nose of the corner of an insert.

Alternatively, the distance "d2" from the nose bisector 90 of the active cutting corner may be selected as having values ranging from 0.5% to 45% of the length of the flank, measured from nose bisector to nose bisector of the corners immediately adjacent the reference flank, preferably 1–40%, most preferably 1.5–35%.

The length of the flank may be measured by known means and generally is considered to be the distance between the bisectors of the respective corners of the insert immediately adjacent the flank. Some inserts, well known in the industry, have radiused corners that blend into their respective flanks at lines where the flank is tangent to the circle defining the radiused corner of the insert. This type of insert, may have a flank length considered to be the distance between the respective tangent lines on the flank.

In a particular embodiment, the insert may have curved cutting edges and wipers in the bottom face, as well. For purposes of this description, discussion will be limited to the top surface form, it being understood that a similar geometry may be provided on the bottom surface. The present invention will become more clear upon consideration of the following embodiments that are intended to be illustrative and not limiting of the scope of the present invention.

Figure 3:
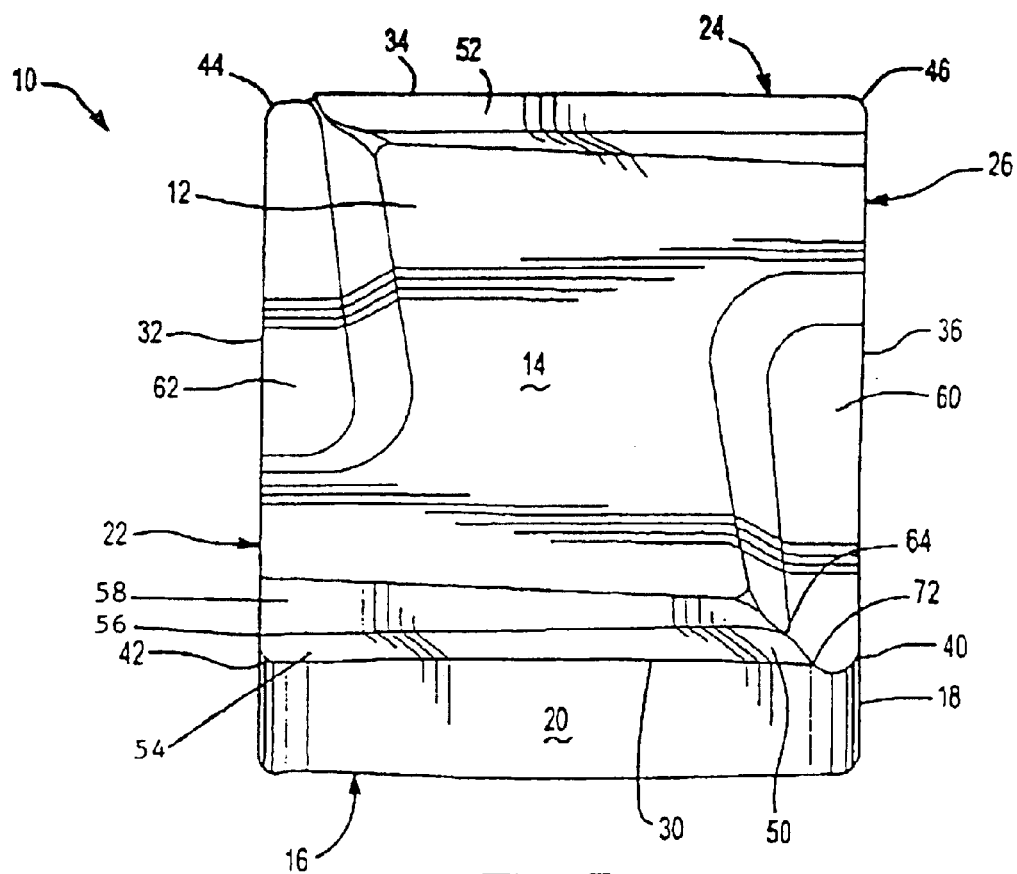
FIG. 3 is a three dimensional view (looking into the top and one side) of a negative insert according to an embodiment of the present invention.
Figure 4:
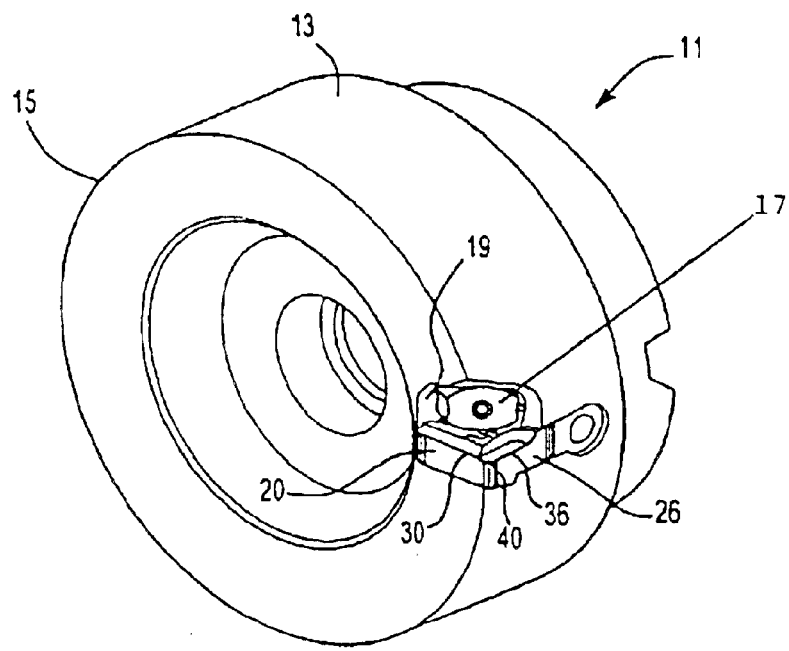
FIG. 4 is a perspective view of a milling tool having secured thereto an insert according to the embodiment shown in FIG. 3.

With reference now to FIGS. 3 and 4, wherein like numerals designate like, components throughout all of the Figures, an embodiment of the present invention is shown in FIG. 3. The indexable cutting insert 10 ha a body 12 of hard wear resistant material. The body 12 includes top and bottom major surfaces 14 and 16, respectively connected by a peripheral wall 18 extending therebetween substantially perpendicularly to both surfaces. Peripheral wall 18 is comprised of flanks 20, 22, 24 and 26. The flanks form cutting edges 30, 32, 34, and 36 at the intersection of the flanks with the top surface 14. Corners 40, 42, 44 and 46 are formed at the intersection of respective pairs of the flanks. In this embodiment, it will be understood by those skilled in the art that the active cutting corners ore 40 and 44 with cutting edges 32 and 36 being lead cutting edges and cutting edges 30 and 34 being finish cutting edges. The leading cutting edge 36 is oriented perpendicularly to the respective finish cutting edge 30 as the insert is viewed in a direction perpendicular to a center portion 14A of the major surface 14.

Top surface 14 is provided with wiper forms 50 and 52 that extend along finish cutting edges 30 and 34. It is desirable that the wiper forms have positive or neutral geometry, thereby providing a versatile insert that may present a positive, neutral or negative cutting edge angle to the workpiece in the use environment. A positive or neutral geometry is recognized in the industry to enable the cutting edge to be presented to the workpiece in a manner which provides a positive, negative or neutral cutting angle. The wiper forms 50 and 52 of FIGS. 3 and 4 have positive geometry.

Each of the wiper forms 50 and 52 is comprised of a descending land 54, a wiper form bottom 56 and an ascending land 58. A descending land 54 extends from each of finish cuffing edges 30 and 34, respectively, downwardly from the major surface 14 and inwardly from flanks 20 and 24, respectively. Descending land 54 intersects ascending land 58 at wiper form bottom 56. An ascending land 58 extends upwardly from each wiper form bottom 56 and inwardly from respective flanks 20 and 24 to terminate at major surface 14. The descending and ascending lands may be radiused or planar. The wiper form bottom may also be radiused or planar. Finish cutting edges 30 and 34 are convexly curved, being lower at the adjacent corners, 40 and 42, and, 44 and 46, respectively, than at apex 72.

Figure 6:
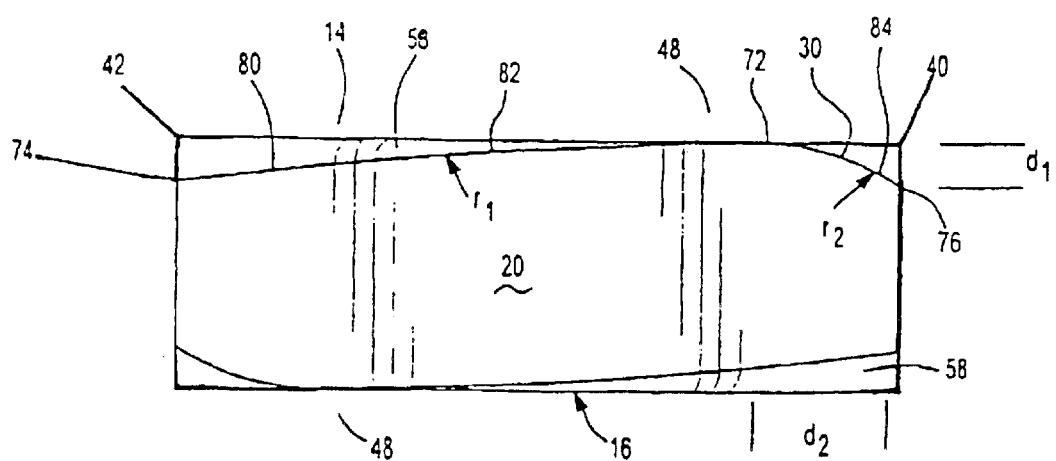
FIG. 6 is side view of the embodiment of FIG. 5.

Due to the presence of the land structure 54, 58, the portions 82 and 84 of the finish cutting edge 30 that are situated on opposite sides of the apex 72 are offset from the center portion 14A of the respective major surface 14 in a direction toward the other major surface 16 as shown in FIG. 6.

The embodiment shown in FIGS. 3 and 4 is also provided with optional non-wiping forms 60 and 62 adjacent respective lead cutting edges 36 and 32. The non-wiping forms are chipbreaker forms which aid in chip control during machining. In embodiments having such optional non-wiping forms, the insert further comprises a blend surface 64 where the wiping form and the non-wiping form blend. The blend surface is generated in a manner well known in the art and may have any geometry which does not interfere with the functioning of the invention.

FIG. 4, shows the insert of FIG. 3 in the use environment of a rotary cutter, in particular a milling cutter 11 having a tool body 13 comprising an outer diameter 15, and an insert retaining device including a wedge 17 and a pocket 19. Only a single insert is shown on the tool body in FIG. 4, it being understood in the art that a plurality of such inserts may be uniformly disposed and releasably secured around the outer diameter 15 of the tool body 13 in a similar manner.

Insert 10 is positioned in pocket 19 with corner 40 and its respective cutting edges 30 and 36 in the active cutting position, but it will be recognized that the opposite corner 44 may in turn be positioned in pocket 19 in the active position relative to the toolholder and secured therein by wedge 17 or other insert retaining devices in a manner well known in the art. While a rotary cutter is shown as the use environment of the invention, it will be understood by those skilled in the art that the invention may be used in any suitable material removal tool which may benefit from the invention. For instance, by way of non-limiting example, milling cutters, boring cutters, and reaming cutters.

In the embodiment shown, the active lead cutting edge 36 has a chipbreaker 60. In an alternative embodiment, the insert may be manufactured with a wiper form 50 extending along each cutting edge of the insert, resulting in each cutting edge being curved, thereby allowing use of all cutting edges of the insert as cutting edges with wipers. The insert cutting edge, provided with the wiper of the invention, that is positioned on the outer diameter of the mill may optionally be rendered inactive by positioning the insert slightly inward of the outer diameter active lead cutting edges of non-wiping inserts secured to the mill. In this manner, all cutting edges of the insert may be utilized in turn as finish cutting edges. Positioning the insert outer diameter cutting edge slightly inward prevents damage to the wiper on the inactive lead cutting edge during machining and allows this edge to be rotated into the finish cutting edge position.

Figure 5:
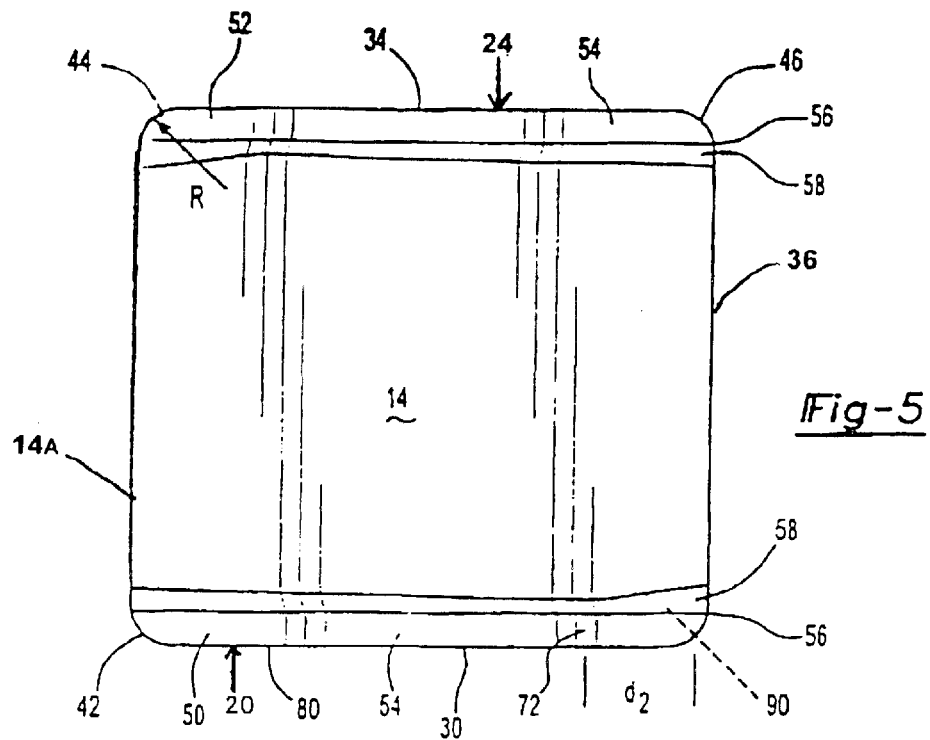
FIG. 5 is top view of an embodiment of the invention.

Referring now to the embodiment shown in FIGS. 5 and 6, FIG. 5 shows a top view of an insert of the invention provided with wiper forms 50 and 52 extending along finish cutting edges 30 and 34, respectively. Corners 40 and 44 are active cutting corners in this embodiment. The corners have a radius of "R" which is selected, based upon tool application, in a manner known in the art. The position of the wiper 48 on the finish cutting edge 30 is selected to be a distance "d2" from the nose bisector 90 of the active cutting corner 40; in this embodiment "d2" is approximately 10% of the length of the flank. In an alternative embodiment, the position of the wiper 48 on the finish cutting edge 30 may be a selected distance "d2" from the nose bisector 90 of the active cutting corner 40 that is approximately equal to two times the radius "R" of the active cutting corner 40. For illustrative purposes, the radius "R" is shown in relation to the other active cutting corner 44, it being understood by those of skill in the art that active cutting corner 40 would have a radius determined in the same manner.

As can be seen in FIG. 5, wiper forms 50 and 52 and curved cutting edges 30 and 34 do not change the substantially flat nature of the flanks 20 and 24 of the insert. This feature allows wipers on all possible cutting edges, including edges formed by the top and bottom major surfaces with the flanks of a negative insert, without sacrificing locating accuracy.

FIG. 6 shows a side view of the insert of FIG. 5 which provides a finish cutting edge 30 wherein curve 80 generating the cutting edge has an apex 72, a first portion 82 defined by a first radius "r1" and a second portion 84 defined by a second radius or a series of radii, "r2". A similar geometry is provided on the bottom surface 16, but for clarity, discussion will be limited to cutting edge 30. In this embodiment, the first portion extends from point of intersection 74 to apex 72 and second portion extends from apex 72 to point of intersection 76. Points of intersection 74 and 76 are positioned a selected distance "d1" from the adjacent major surface 14 that creates finish cutting edge 40 by intersection with reference flank 20.

In one embodiment of the invention, a curved finish cutting edge has a second portion defined by a series of radii which decrease in value along the finish cutting edge from apex 72 to active cutting corner 40. Alternatively, the curved finish cutting edge has a first portion and a second portion defined by curves of continually changing radius.

Wipers according to the instant invention may be manufactured on one or more cutting edges of an insert. The invention also optionally provides a versatile insert having wipers according to the invention on all cutting edges. For example on a square, negative insert, the wiper may be manufactured on all eight cutting edges. Alternatively, the wiper may be used on the finish cutting edge of an insert in conjunction with other forms on the lead cutting edge of the insert, see for example, FIGS. 3 and 4. In multiple insert cutters, such as mills, a benefit of producing an insert having a chipbreaker form on the lead cutting edge in combination with the wiper on the finish cutting edge will be recognized as providing the insert of the invention with a lead cutting edge that can be used in cutting. This feature decreases the amount of metal required to be cut, known as chip load, by a following insert located in the toolholder such that the following insert cuts after the wiper insert. The decreased chip load on the following insert prolongs its life. The application of the invention is preferably toward finish cutting edges, but may optionally be applied to lead cutting edges, where finish on the part surface being created by the lead cutting edge can be improved.

A method of producing an improved finish on a workpiece by machining with a cutting tool of the invention comprises the steps of selecting an insert of the invention, as it has been described herein, positioning the insert in a cutting tool pocket wherein a finish cutting edge is presented to the workpiece as an active finish cutting edge; securing the cutting insert into the pocket; and machining the workpiece.

It is intended that the specification and examples be considered as exemplary only. Other embodiments of the invention, within the scope and spirit of the following claims will be apparent to those of skill in the art from practice of the invention disclosed herein and consideration of this specification. All documents referred to herein are incorporated by reference hereby.

I claim:

1. A cutting insert of hard, wear resistant material comprising a body having substantially polygonal major surfaces, substantially planar flanks extending between the major surfaces respective pairs of the flanks intersecting to form corners, at least one pair of cutting edges comprising a lead cutting edge and a finish cutting edge sharing a common corner and being formed by intersection of one of the major surfaces with one of the respective pairs of flanks, wherein the finish cutting edge is a convex curve in a plane of the flank that forms the finish cutting edge, the curve having an apex proximate the common corner, the apex forming a wiper on the finish cutting edge, the one major surface including a center portion and a land disposed between the canter portion and the finish cutting edge wherein the finish cutting edges defines an edge of the land, the finish cutting edge including first and second portions situated on opposite sides of the apex and offset from the one major surface in a direction toward the other major surface.

2. The cutting insert according to claim 1, wherein the apex of the wiper curve is positioned a selected distance from the common corner, the distance is from about 0.5% to about 46% of the length of the flank that forms the finish cutting edge.

3. The cutting insert of claim 1 wherein the land constitutes a wiper form having a positive geometry.

4. The cutting insert of claim 1 wherein the first position is defined by a first radius and a the second portion is defined by a second radius.

5. The cuffing insert of claim 4 wherein the second radius of the curve decreases along the finish cutting edge from the apex to the common corner.

6. The cutting insert of claim 1 wherein the first portion is defined by a first radius and the second portion is defined by a plurality of radii.

7. The cutting insert of claim 1 further comprising a chipbreaker form extending along at least a portion of the iced cutting edge.

8. The cutting insert according to claim 1 wherein the finish cutting edge is curved along its entire extent.

9. The cutting insert according to claim 1 wherein the lead cutting edge and the finish cutting edge are oriented perpendicularly to one another as the insert is viewed in a direction perpendicular to the center portion of the one major surface.

10. The cutting insert according to claim 1 wherein the leading cutting edge and the finish cutting edge constitute a first leading cutting edge and a first finish cutting edge, respectively, the insert further including a second leading cutting edge and a second finish cutting edge identical respectively to the first leading cutting edge and the first finish cutting edge, wherein the insert is indexible.

11. A cutting insert of hard, wear resistant material comprising a body having substantially polygonal major surfaces, substantially planar flanks extending between the major surfaces respective pairs of the flanks intersecting to form corners, cutting edges being formed by intersection of one of the major surfaces with the flanks, each cutting edge being a convex curve in the plane of the respective flank and ascending toward the major surface that forms the cutting edge, the curve having an apex forming a wiper on the cutting edge wherein the wiper is proximate a corner, the one major surface including a center portion and a land disposed between the center portion and the finish cutting edge, wherein the finish cutting edge defines an edge of the land, the finish cutting edge including first and second portions situated on opposite sides of the apex end offset from the one major surface in a dire ction toward the other major surface.

12. The cutting insert of claim 11 wherein the flanks are substantially perpendicular to the surfaces.

13. The cuffing insert according to claim 11 wherein the finish cutting edge constitutes a first finish cutting edge, the insert further including a second finish cuffing edge identical to the first finish cutting edge, wherein the insert is indexible.

14. A material removal tool having at least one insert mounted thereto comprising a body having substantially polygonal major surfaces, substantially planar flanks extending between the major surfaces respective pairs of the flunks intersecting to form corners, at least one pair of cutting edges sharing a common corner and being formed by intersection of one of the major surfaces with one of the respective pairs of flanks, the insert being positioned in the tool with the common corner as the active cutting corner and the pair of cutting edges comprising a lead cutting edge and a finish cutting edge wherein the finish cutting edge is a convex curve in a plane of the flank that forms the finish cutting edge, the curve having an apex proximate the common corner, the apex forming a wiper on the finish cutting edge, the one major surface including a center portion and a land disposed between the center portion and the finish cutting edge, wherein the finish cutting edge define, an edge of the length the finish cutting edge including first and second portions situated on opposite sides of the apex and offset from the one major surface in a direction toward the other major surface.

15. The material removal tool of claim 14 wherein the tool is a rotary milling cutter.

* * * * *